United States Patent
Serpelloni

(10) Patent No.: US 7,108,885 B2
(45) Date of Patent: Sep. 19, 2006

(54) LIQUID MALTITOL COMPOSITION, PROCESS FOR ITS MANUFACTURE AND ITS USES

(75) Inventor: Michel Serpelloni, Beuvry-les-Bethune (FR)

(73) Assignee: Roquette Freres, Lestrem (FR)

( * ) Notice: Subject to any disclaimer, the term of this patent is extended or adjusted under 35 U.S.C. 154(b) by 497 days.

(21) Appl. No.: 10/304,936

(22) Filed: Nov. 26, 2002

(65) Prior Publication Data

US 2003/0190397 A1    Oct. 9, 2003

(30) Foreign Application Priority Data

Apr. 4, 2002    (FR) .................................. 02 04225

(51) Int. Cl.
  *A23L 1/236*    (2006.01)
(52) U.S. Cl. .......................... 426/548; 426/3; 426/660; 127/29; 127/34
(58) Field of Classification Search .................... 426/3, 426/6, 548, 658, 660; 127/29, 34
  See application file for complete search history.

(56) References Cited

U.S. PATENT DOCUMENTS

| 4,671,961 A | 6/1987 | Patel et al. |
| 4,671,967 A | 6/1987 | Patel et al. |
| 4,728,515 A | 3/1988 | Patel et al. |
| 4,846,139 A | 7/1989 | Devos et al. |
| 4,849,023 A | 7/1989 | Devos et al. |
| 5,478,593 A | 12/1995 | Serpelloni et al. |
| 5,637,334 A | 6/1997 | Yatka et al. |

FOREIGN PATENT DOCUMENTS

| EP | 0171964 | 2/1986 |
| EP | 0937733 | 8/1999 |
| WO | WO 87/02222 | 4/1987 |

OTHER PUBLICATIONS

An English translation of JP50-30703 (application No. 47-129327) in the name of EIZAI.

*Primary Examiner*—Leslie Wong
(74) *Attorney, Agent, or Firm*—Young & Thompson

(57) ABSTRACT

A liquid maltitol composition, characterized in that the composition has, the contents being expressed by weight relative to the dry matter content of the composition: a content of 94 to 98 % of maltitol, a content of 0.2 to 3 % of sorbitol, a content of 0.1 to 3 % of maltotriitol and of at least one polyol having a degree of polymerisation equal to 3 (DP3) chosen from panitol, isomaltotriitol, and isopanitol, said content corresponding to the equation (1):

$$(R) = \frac{\text{content of maltotriitol}}{\text{total content of DP3 polyols}} \times 100 < 10$$

a dry matter content of between 70 to 85 %. The composition may be used in products such as confectionery products and in particular in chewing gums and hard coating layers.

21 Claims, No Drawings

LIQUID MALTITOL COMPOSITION, PROCESS FOR ITS MANUFACTURE AND ITS USES

The subject of the present invention is the use of a liquid sweetening maltitol composition in a confectionery product. This use applies in general to the preparation of confectionery products which are fully crystallised (such as frosting for boiled sweets), semicrystallised (such as chewing gums, bubble gums, chewy pastes, marzipans, fondants, caramels, fudges, lozenges, nougats), or noncrystallised (such as nougatine) and to that of hard and soft coating layers, and, preferably, to chewing gums and to hard coating layers.

The present invention also relates, as novel products, to the confectionery products thus obtained and the abovementioned liquid maltitol composition.

Various maltitol syrups which are commonly used in particular in so-called "sugar-free" confectionery products are known.

Commercially available maltitol syrups are manufactured by catalytic hydrogenation of starch hydrolysates rich in maltose, and generally exhibit a richness in maltitol of 50 to 89%.

Some of them comprise less than 60% of maltitol and are considered as being low in maltitol. They are in particular syrups marketed under the names LYCASIN® 80/55, POLYSORB®, HYSTAR®, MALTIDEX® 200. The carbohydrate composition of LYCASIN® 80/55 in particular is about 6% of DP1 saccharides (sorbitol), about 52% of DP2 disaccharides (maltitol), about 18% of DP3, 1.5% of DP4, 2% of DP5, 3.7% of DP6, 3.4% of DP7, 2.2% of DP8, 1.0% of DP9 and about 11% of DP10 or higher (DP: Degree of Polymerisation). Such syrups may also be mixed with glycerol for use in chewing gums, as described in the following documents: U.S. Pat. No. 4,671,961; U.S. Pat. No. 4,671,967 and U.S. Pat. No. 4,728,515. Glycerol has the effect of limiting the hardness and the brittle character of the chewing gum sticks thus prepared.

The document EP-A-171 964 describes maltitol syrups having sweetening and humectant properties, comprising 12 to 24% of sorbitol, 60 to 80% of maltitol and 8 to 16% of DP3 saccharides and higher. These syrups may be used in numerous applications such as sugar-free confectionery products, dietetic foods, toothpastes and mouthwashes.

Other syrups, having a higher content of maltitol, contain from 60 to 77% thereof. There may be mentioned, for example, the syrups MALTISORB® 75/75, MALTIDEX® 100, FINMALT® and MALBIT®. There may also be mentioned syrups of the MALTISORB® 70/85 and MALTIDEX® 080 type which are enriched with maltitol up to a content of about 85%.

The document JP-A-50 30703 describes a process for the manufacture of sweets which do not stick to the teeth, using a liquid maltitol syrup MALBIT®, known to contain only from 73% to 77% of maltitol.

Maltitol syrups are also known which are prepared from powdered maltitol, dissolved in water up to a maximum concentration of 150 g/100 g of water. These syrups, which are described in the document U.S. Pat. No. 5,637,334, are intended for use in chewing gum. They may be prepared with a higher concentration and at a higher temperature, but the risk of crystallisation is thereby increased.

The document EP-A-185 595, of which the applicant is proprietor, describes a process for the preparation of syrups rich in maltitol. The syrups obtained have a maltitol content of up to 97.5%, less than 5% of sorbitol and a maltotriitol content of between 2.5 and 13%.

The document JP 2002-47174 describes a coating process which uses a maltitol syrup having a richness in maltitol greater than 90%, comprising less than 3% of maltotriitol for a polyol DP3 content of about 4%, used in combination with a solid suspension base consisting of insoluble compounds such as talc, kaolin, calcium carbonate, titanium dioxide. This base suspension is used in a ration of 0.6 to 1.4 parts by weight per part of maltitol syrup, ad constitutes a crystallization seed which is essential for obtaining satisfactory coating. Furthermore, this base suspension confers whiteness and crunchiness on the products thus coated.

It is after having identified and analysed the defects of the prior art compositions and syrups, in the light of the problems encountered by confectioners, that the applicant realised that a liquid sweetening composition was currently still being sought which is capable of being directly used in the manufacture of confectionery products and satisfying the various requirements of practical use, that is to say:

possessing plasticizing and binding properties necessary for the manufacture of certain confectionery products,
supplying only a minor quantity of water to the product to which it is intended to be added,
exhibiting rheological properties such that it is convenient to handle,
being easy to prepare,
stable per se and capable of conferring on the products into which it is intended to be incorporated sufficient stability during storage, in particular in relation to the phenomenon of crystallisation which leads to an increase in the hardness of the said products,
exhibiting a high sweetening power, making it possible to reduce the addition of synthetic intense sweetener.

After long and fastidious research studies, the applicant has found that the costs of manufacture of certain confectionery products could be notably reduced by replacing, in these confectionery products, all or some of the powdered maltitol by a liquid maltitol composition having a specially selected richness in maltitol and in which coexist, in addition to the maltitol, other polyols capable of accelerating, or at the very least not slowing down, the crystallisation phenomena, when they are present therein in specially selected amounts.

The present invention therefore relates to a liquid maltitol composition, characterized in that it has, the contents being expressed by weight relative to the dry matter content of the composition:

a content of 94 to 98% of maltitol,
a content of 0.2 to 3% of sorbitol,
a content of 0.1 to 3% of maltotriitol and of at least one polyol having a degree of polymerisation equal to 3 (DP 3) chosen from the group consisting of panitol, isomaltotriitol, isopanitol, the said content corresponding to the inequation (1):

$$(R) = \frac{\text{content of maltotriitol}}{\text{total content of } DP3 \text{ polyols}} \times 100 < 10$$

a dry matter content of between 70 and 85%.

According to a preferred embodiment of the invention, the liquid maltitol composition in accordance with the invention has a dry matter content of between 70 and 80%, its maltitol content is between 95 and 98%, its sorbitol content is between 0.6 and 2% and R<8.

The present invention also relates to the use of the liquid maltitol composition in accordance with the invention as a sweetening composition or as a texturing agent in products intended to be ingested and in particular chewing gums/ chewy pastes, marzipans, nougatine, fondants, caramels, fudges, nougats, aerated and grained boiled sweets (mints), lozenges, frosting products, hard and soft coating layers.

It was not obvious that such a liquid maltitol composition could exhibit all the qualities required in order to make confectionery products, that is to say which are simultaneously easy to produce, stable, non cariogenic and which have excellent organoleptic qualities.

Indeed, although maltitol has enormous similarities with sucrose from the point of view of the organoleptic, physicochemical and functional properties and although the behaviour of these two products in confectionery products are generally considered to be very similar, a very different basic property exists between the two molecules; that linked to their kinetics of crystallisation. In other words, the applicant realised that in the case of maltitol, when crystallisation is induced by nuclei, the kinetics of crystallisation are always difficult to control, unlike those of sucrose. That is to say that these kinetics are either too fast or too slow, which causes great difficulties during the manufacture of confectionery products, as well as problems of stability thereof over time.

In general, in the field of crystallisation, it is known that the presence of impurities, in an aqueous solution containing the molecule which it is desired to crystallise, influences the viscosity of the medium and hampers the purity of the crystal by integration of empty spaces and dislocations into the network. By mobilising the active sites, the impurities thereby strongly reduce the rate of crystallisation.

That is the reason why up until now, and to mention only this example, indusTest confectioners who wished to coat their products with a coating maltitol syrup, prepared such a syrup by dissolving in water a crystallised maltitol powder (from which the impurities are therefore absent), in order to dispense with all the uncertainties linked to the abovementioned crystallisation phenomena.

Against all expectations, the applicant has discovered, surprisingly and unexpectedly, that this general teaching on the influence of impurities on the rate of crystallisation did not apply at least to the case of maltitol.

The applicant has indeed found that all the molecules other than maltitol do not play the same role with respect to the rate of crystallization of maltitol and therefore the quality of crystallisation obtained. In accordance with the invention, it has thus been found that sorbitol, maltotriitol, panitol, isomaltotriitol and isopanitol did not have, at least at certain concentrations, the same influence on the rate of crystallisation of maltitol.

The applicant has therefore found a very effective means for successfully controlling the rate of crystallisation of maltitol and has developed a process for controlling the rate and the quality of crystallisation of the maltitol contained in a crystallisable liquid maltitol composition or a confectionery such as in particular chewing gums and hard coating layers. In accordance with the invention, it has been found that certain molecules which were normally present in maltitol syrups had only little or no influence on the rate of crystallisation of maltitol at certain concentrations. Sorbitol, panitol, isopanitol, isomaltotriitol and 1,6-maltosylmaltitol may be classified in this category. Other molecules have, on the other hand, an unfavourable effect on the rate of crystallisation of maltitol at certain concentrations; that is the case for maltotriitol.

On the strength of this surprising fact, the applicant developed the novel liquid maltitol compositions described above, which are particularly well suited to the manufacture of the abovementioned confectionery products and in particular to that of chewing gums and of hard coating layers.

As regards the preparation of the liquid maltitol compositions in accordance with the invention, the procedure may be carried out without limitation, according to one of the methods described below:

A fraction comprising a syrup consisting of 94 to 98% by weight, on a dry basis, of maltitol is first of all prepared, and sorbitol and the DP3 polyols are added to this fraction in chosen proportions for each of these various constituents and such that the inequation (1) is verified.

A high maltose content syrup, glucose, panose, maltotriose, isopanose and isomaltotriose are mixed in the correct proportions and then the hydrogenation of this mixture and its purification are carried out in a manner known per se.

The concentration of a mixture, in the correct proportions, of a high maltitol content syrup obtained, for example, according to the document EP-A-0 185 595, of which the applicant is proprietor, or alternatively of pulverulent, partially or completely crystalline, maltitol, and of sorbitol, maltotriitol, panitol, isomaltotriitol and isopanitol, is carried out.

As a guide, the maltotriose, panose, isomaltotriose and isopanose may be obtained by the action of pullulanases, neopullulanase and isopullulanase on pullulan.

As regards the water concentration of the composition in accordance with the invention, a dry matter content is preferably chosen such that the composition is supersaturated with maltitol and that the latter is present in an amorphous state. That is why the dry matter content of the composition according to the invention is between 70 and 85%, preferably between 70 and 80%. At such dry matter contents, the composition according to the invention may be kept at a temperature of between 50 and 80° C. without the appearance of problems of colouring.

Excellent results have thus been obtained, for example with a liquid composition having a maltitol content of 95%, a sorbitol content of 0.9% and a DP3 polyol content of 2.82% with R<8 or alternatively having a maltitol content of 97.1%, a sorbitol content of 1.1% and a DP3 polyol content of 1.5% with R<8.

Such a composition according to the invention finds in particular its full usefulness in:

processes for the manufacture of confectionery products comprising a step of adding a filler in the form of powdered maltitol, where all or some of the said filler may be replaced with the said composition, processes for the manufacture of confectionery products comprising a step of adding a filler by dissolving powdered maltitol in water, where the said step may be replaced completely or partly by a step of adding a liquid composition in accordance with the invention.

The confectionery products for which the use of the liquid maltitol composition is greatly advantageous in order to facilitate their manufacture and to reduce the cost thereof, while preserving their organoleptic qualities, are in particular chewing gums and hard coating layers for which excellent results have been obtained.

The object of the invention is therefore also a process for the manufacture of a chewing gum or of a bubble gum comprising the steps consisting in:

preparing from 5 to 95% of basic gum, preparing from 1 to 95% of powdered maltitol, from 0.5 to 50% of a maltitol syrup, and from 0 to 50% of a sorbitol syrup, preparing from 0 to 30% of glycerol, preparing from 0.1 to 10% of a flavouring, and from 0.001 to 1% of an intense sweetener, mixing the basic gum, the powdered maltitol, the maltitol syrup, the flavouring, the intense sweetener and optionally the sorbitol syrup and the glycerol in order to manufacture the chewing gum, characterized in that all or some of the powdered maltitol is replaced by a liquid maltitol composition in accordance with the invention.

The traditional maltitol syrup and the sorbitol syrup which are used may be, for example, those marketed by the applicant under the names LYCASIN® 80/55 HDS and NEOSORB® 70/70, respectively.

To control the water content of the chewing gum or of the bubble gum, the replacement of the powdered maltitol with the liquid maltitol composition in accordance with the invention may be accompanied by a replacement of all or some of the liquid sweeteners (sorbitol syrup, maltitol syrup, glycerol) by the liquid maltitol composition according to the invention or by the use of more concentrated or anhydrous liquid sweeteners.

Advantageously, the chewing gums or bubble gums according to the invention comprise from 1 to 40%, preferably from 1 to 25%, of the liquid maltitol composition in accordance with the invention.

The chewing gums thus obtained have excellent properties both from the Theological and organoleptic point of view or as regards their preservation by virtue of the good crystallisation capacity, the low water content and the organoleptic properties of the composition in accordance with the invention.

The chewing gums in accordance with the invention may be coated, according to a hard coating process, using the said composition as will be described in greater detail below.

The subject of the invention is also a process for the hard coating of a product, comprising at least one step of applying a coating syrup composed of maltitol and at least one binder, characterized in that all or some of the coating syrup or of the binder is replaced by a liquid maltitol composition in accordance with the invention, so as to reduce the brittleness of the edible food thus coated.

For the purposes of the invention, the expression binding agent is understood to mean compounds such as gum arabic, gum talha, gelatin, modified starches and celluloses, dextrins, indigestible dextrins, maltodextrins and branched maltodextrins, alone or as a mixture with each other.

According to a general embodiment of the invention, the process consists in homogeneously moistening the surface of the products to be coated in motion in a coating pan using the said liquid maltitol composition.

According to a preferred embodiment of the invention, not more than 60%, preferably not more than 50% and even more preferentially not more than 40% of the crystallized maltitol contained in the coating syrup is substituted by a liquid maltitol composition according to the invention.

A variant of the process according to the invention optionally consists in then adding, in pulverulent form, a quantity of maltitol powder of high purity, preferably greater than 90% by weight, and still more preferably greater than 95% by weight.

After distributing the powder and optionally drying the whole, another moistening/supply-of-powder cycle may be carried out. The process requires at least one, but preferably at least two applications, in pulverulent form, of a maltitol powder of high purity. These applications may be carried out during the same cycle or alternatively during different cycles knowing that a cycle is defined in the present invention as comprising only one application of the liquid maltitol composition in accordance with the invention.

In other words, the coating process in accordance with the invention may comprise at least one step for distributing a maltitol powder having a purity greater than 90%, preferably greater than 95% by weight, the said application and distribution steps being carried out in any order.

Although this is not necessary for obtaining quality coated products, it can be envisaged to add insoluble compounds such as talc, kaolin, calcium carbonate, calcium sulphate and titanium dioxide to the coating syrup.

It should be noted that the products to be coated may be optionally rubbed beforehand according to conventional techniques known to persons skilled in the art. Of course, it is possible to finally carry out a conventional polishing in order to improve the appearance of the products. In this case, fatty substances, lacquers or waxes, for example, are used.

The coating process in accordance with the invention makes it possible to coat all types of products, such as in particular food products such as confectionery products, chewing gums, bubble gums, tablets, lozenges, jelly products, chewy pastes, hard sweets, chocolate products, dried fruits such as almonds, hazelnuts, pharmaceutical or veterinary products such as pills or tablets, products for animals, dietetic products such as plant granules, seeds or seed grains, agglomerated fertilizer powders, additives based on enzymes or microorganisms such as yeasts, detergent tablets, vitamins, flavourings or perfumes, acids, sweeteners or various active ingredients.

The implementation of the process which has just been described makes it possible to obtain, in a simple fashion, coated products which are particularly resistant to breaking, with particularly short coating times for a degree of size increase of about 30%.

The invention will be understood more clearly with the aid of the following examples which are intended to be illustrative and nonlimiting.

EXAMPLE 1

CRYSTALLISATION

1. Test Conditions

The syrup to be crystallised is concentrated to 80% of dry matter content, placed in a laboratory crystallising dish and stabilised at a temperature of 80° C., and then the crystallising dish is cooled, with slow stirring, at the rate of 10° C. per 24 hours.

Various bases are prepared having the following composition:

| Base (% on a dry basis) | Maltitol | Sorbitol | DP3 polyols | R |
|---|---|---|---|---|
| I1 | 97.1 | 1.1 | 1.5 | 6.67 |
| I2 | 96.9 | 2.9 | 0 | — |
| I3 | 96.5 | 0 | 3.3 | 0 |
| I4 | 95 | 0.9 | 2.8 | 6 |
| I5 | 94 | 1.3 | 3.9 | — |
| I6 | 95 | 0.9 | 2.9 | 11 |

2. Results

| Monitoring of DM of the mother liquors | | | | | | |
|---|---|---|---|---|---|---|
| T (° C.) | I1 | I2 | I3 | I4 | I5 | I6 |
| 70 | 80.0 | 80.0 | 80.0 | 80.0 | 80.0 | 80.0 |
| 60 | 78.7 | 80.0 | 80.0 | 79.5 | 80.0 | 80.0 |
| 50 | 76.3 | 76.4 | 78.4 | 77.9 | 80.0 | 80.0 |

3. Conclusions

At a similar maltitol content, the compositions in accordance with the invention I1 and I4 crystallise rapidly at 60° C., whereas it is necessary to fall to 50° C. for composition I2 to crystallise, then composition I3. Compositions I5 and I6 did not crystallise at 50° C.

EXAMPLE 2

Chewing Gum

Chewing gum compositions are prepared according to the following formulas:

| | Chewing gum with powdered maltitol | Chewing gum according to the invention |
|---|---|---|
| Basic gum FLAMA T (CAFOSA) | 25.0% | 25.0% |
| Crystallised maltitol MALTISORB ® P 35 (99% maltitol on a dry basis) | 60.5% | 55.0% |
| Composition according to the invention I1, 80% DM | — | 6.8% |
| Maltitol syrup LYCASIN ® 80/55 (75% DM) (52% maltitol on a dry basis) | 11.0% | — |
| Maltitol syrup LYCASIN ® 80/55 HDS (85% DM) (52% maltitol on a dry basis) | — | 9.7% |
| Glycerol | 1.0% | 1.0% |
| Liquid strawberry flavouring (SILESIA 111/8304169) | 1.8% | 1.8% |
| Powdered strawberry flavouring (SILESIA 121/8108030) | 0.5% | 0.5% |
| Ground citric acid monohydrate | 0.2% | 0.2% |
| | 100.0% | 100.0% |

The molten base gum (placed overnight in an oven at 50° C.) is introduced into a mixer-kneader possessing two Z-shaped arms and a jacket maintained at 45° C. by circulation of water in the jacket. A third of the crystallised maltitol and the liquid maltitol composition in accordance with the invention are added and the mixture is kneaded for 4 min.

The LYCASIN® 80/55 is added and the mixture is kneaded for 1 min. A third of the crystallised maltitol and the glycerol are added and then the mixture is kneaded for 4 min. A third of the crystallised maltitol is added and the mixture is kneaded for 4 min. The powdered strawberry flavouring and the ground citric acid are added and the mixture is kneaded for 2 min. The liquid strawberry flavouring is added and the mixture is kneaded for 1 min. The paste is removed from the kneader. It is laminated and cut into sticks 5 mm thick.

The chewing gums produced have the following characteristics:

| | Chewing gum with powdered maltitol | Chewing gum according to the invention |
|---|---|---|
| Maltitol content | 64.2% | 64.0% |
| Water content | 2.75% | 2.81% |
| Degree of replacement of crystallised maltitol by dry matter of liquid maltitol composition according to the invention | 0% | 9% |
| Texture | Flexible bound, chewable | Flexible, bound, chewable, identical to that of the chewing gum with powdered maltitol |
| Taste | Excellent | Excellent, identical to that of the chewing gum with powdered maltitol |

EXAMPLE 3

Coating

Sugar-free chewing gums in the form of cushions about 1.95 cm long by about 1.15 cm wide are coated according to the process described in patent EP-B1-0,625,311.

Used for the coatings are coating syrups containing 72% of dry matter and at 70° C. whose dry matter contents have the following compositions (Control based on crystallised maltitol. Test 1: complete replacement of crystallised maltitol by a liquid composition not conforming to the invention. Test 2: total substitution of crystallized maltitol by a composition not according to the invention, according to JP 2002-47174 (AMALTY®) having a maltitol content of 95% based on dry matter and a ratio R=2.9/3.9×100=74.

Test 2: complete replacement of crystallised maltitol by a liquid composition in accordance with the invention):

| | Control % on a dry basis | Test 1 % on a dry basis | Test 2 % on a dry basis | Test 3 % on a dry basis |
|---|---|---|---|---|
| Crystallised maltitol MALTISORB ® P200 | 92.50 | — | — | — |
| Composition according to the invention I4 | — | — | — | 99.50 |

-continued

|  | Control % on a dry basis | Test 1 % on a dry basis | Test 2 % on a dry basis | Test 3 % on a dry basis |
|---|---|---|---|---|
| Composition not conforming to the invention (93% maltitol on a dry basis) | — | 99.50 | — | — |
| Composition not conforming to the invention, according to JP 2002-47174, without base suspension (95% maltitol/dry matter and R = 74) | — | — | 99.5 | — |
| Solution of gum arabic containing 40% DM | 7.00 | — | — | — |
| TiO$_2$ | 0.50 | 0.50 | — | 0.50 |
|  | 100.00 | 100.00 |  | 100.00 |

1. Tests and Control 50 kg of centres to be coated are placed in a rotating coating machine and the coating syrup is sprayed at 70° C. at the rate of 8 to 20 g per kg of centres at the start of coating and 22 to 26 g per kg of centres at the end of coating. 2 to 5 g of crystallised maltitol MALTISORB® P 35 are dusted at the start of coating (0 g/kg of centres at the end of coating) and allowed to spread out for 0.5 min to 1 min without drying with an air stream. Drying is then carried out with dry air at 25–35° C. for 3 to 5 min. These operations are repeated until a coated layer/centre weight ratio=35/65 is obtained. Smoothing is carried out with carnauba wax.

2. Result/Duration of Coating

Control: no coating problems; duration of coating=4 h 16 min.

Tests 1 and 2: huge problems of sticking due to an excessively slow crystallisation. Coating not achievable.

Test 3: duration of coating=3 h 50 min.

3. Test of Breaking of the Finished Products

This test consists in dropping the coated chewing gums from a height of 1 m onto a metal base and in counting the percentage of corners broken immediately after coating or after 3 days of storage.

|  | Control | Test 2 |
|---|---|---|
| Immediately after coating | 1.5% | 0% |
| After 3 d of storage | 24% | 4% |

Complete replacement of crystallised maltitol by the composition in accordance with the invention increases the breaking resistance of the coated layers.

EXAMPLE 4

Coating

Sugar-free chewing gums in the form of cushions about 1.95 cm long by about 1.15 cm wide are coated according to the process described in patent EP-B1-0,625,311.

Used for the coatings are coating syrups containing 72% of dry matter and at 75° C. whose dry matter contents have the following compositions (Control based on crystallised maltitol. Test: replacement of 50% of crystallised maltitol by a liquid maltitol composition in accordance with the invention):

|  | Control (% on a dry basis) | Test (% on a dry basis) |
|---|---|---|
| Crystallised maltitol MALTISORB® P200 | 93.80 | 46.90 |
| Composition according to the invention I4 | — | 46.90 |
| Solution of gum arabic containing 40% DM | 5.00 | 5.00 |
| TiO$_2$ | 1.00 | 1.00 |
| Acesulfame K | 0.20 | 0.20 |
|  | 100 | 100 |

1. Test and Control 50 kg of centres to be coated are placed in a rotating coating machine and the coating syrup is sprayed at 75° C. at the rate of 6 to 14 g per kg of centres at the start of coating and 16 to 18 g per kg of centres at the end of coating. 4 to 5 g of crystallised maltitol MALTISORB® P 35 are dusted at the start of coating (0 g/kg of centres at the end of coating) and allowed to spread out for 0.5 min to 1 min without drying with an air stream. Drying is then carried out with dry air at 23–28° C. for 2.5 to 5 min. These operations are repeated until a coated layer/centre weight ratio=35/65 is obtained. Smoothing is carried out with carnauba wax.

2. Duration of coating

|  | Total duration |
|---|---|
| Control | 4 h 28 min |
| Test | 4 h 25 min |

Partial replacement of crystallised maltitol by a liquid maltitol composition in accordance with the invention does not slow down the rate of coating.

3. Test of Breaking of the Finished Products

|  | Control | Test |
|---|---|---|
| Immediately after coating | 14.5% | 8% |
| After 2 d of storage | 13.5% | 12% |

The partial replacement of crystallised maltitol by the liquid maltitol composition in accordance with the invention increases the breaking resistance of the coated layers.

EXAMPLE 5

Sugar-Free Fondant

Sugar-free fondants are produced according to the following recipes:

|  | Control with crystallised MALTISORB ® | | Test according to the invention | |
|---|---|---|---|---|
|  | Composition used (by weight) | Composition of the finished product (% by weight) | Composition used (by weight) | Composition of the finished product (% by weight) |
| Crystallised maltitol MALTISORB ® P200 | 526.4 | 60.3 | — | — |
| Composition I4 80% DM | — | — | 692.6 | 63.2 |
| Sorbitol syrup NEOSORB ® 70/70 | 322.1 | 25.8 | 282.5 | 22.9 |
| Water | 144.0 | — | 17.4 | — |
| Crystallised maltitol MALTISORB ® P35 (initiator) | 7.5 | 0.9 | 7.5 | 0.9 |
| Residual water | — | 13.0 | — | 13.0 |
|  | 1000.00 | 100.00 | 1000.00 | 100.00 |

1. Procedure (Control and Test)

The mixture (maltitol MALTISORB® P200 or composition according to the invention)+water+NEOSORB® 70/70 is heated until a dry matter content of 85% is obtained. The mixture is beaten in a planetary mixer (at the maximum speed) until the temperature reaches 47° C. The initiator is then added. Finally, the mixture is beaten (maximum speed) for 15 min.

2. Characteristics of the Products Obtained

The control fondant and the fondant in which the MALTISORB® P200 was replaced by the composition in accordance with the invention both have the same appearance, the same texture and the same taste. The maltitol crystallises in the same manner in the control and the test. Their maltitol contents are 60.3% for the control and 60.0% for the test, respectively.

EXAMPLE 6

Frosting of Boiled Sweets

A control frosting solution (A) is prepared by dissolving 750 g of crystallised maltitol MALTISORB® P200 in 250 g of water and heating this solution to 110° C.

A frosting solution (B) with the composition in accordance with the invention is prepared by heating to 110° C. composition I1 in accordance with the invention (80% DM, 97.1% maltitol on a dry basis, R=6.67).

Tests for frosting boiled sweets with solution A or solution B are carried out according to the following protocol:

Place boiled sweets manufactured from LYCASIN® HBC (maltitol syrup sold by the applicant) in a coating pan.

Pour over the rotating boiled sweets in the pan 15 ml of frosting solution (A or B) at 110° C. per kg of boiled sweets.

Allow the frosting syrup (A or B) to spread out and to crystallise at the surface of the boiled sweets for 2 min. Then dust with MALTISORB® P 200. Leave the boiled sweets in rotation for 15 min.

Pour over the rotating boiled sweets in the pan 15 ml of frosting solution (A or B) at 110° C. per kg of boiled sweets.

Allow the frosting syrup (A or B) to spread out and to crystallise at the surface of the boiled sweets for 15 min.

Wait for the complete cooling of the boiled sweets before packaging them.

The boiled sweets frosted from the frosting solution B have an appearance and a stability comparable to those of the boiled sweets frosted with solution A.

EXAMPLE 7

Sugar-Free Almond Pastes

Sugar-free almond pastes are produced according to the following recipes (control with crystallised maltitol MALTISORB®. Test with the composition according to the invention):

|  | Composition used (by weight) | |
|---|---|---|
|  | Control | Test |
| Crystallised maltitol MALTISORB ® P200 | 438.0 | 90.0 |
| Composition according to the invention I1 80% DM | — | 448.0 |
| Sorbitol syrup NEOSORB ® 70/70 | 268.0 | 253.1 |
| Water | 90.0 | 4.9 |
| Almond powder | 171.5 | 171.5 |
| Crystallised maltitol MALTISORB ® P35 (initiator) | 2.5 | 2.5 |
| Glycerol | 30.0 | 30.0 |
|  | 1000.00 | 1000.00 |

Procedure (Control and Test)

The crystallised maltitol or the composition according to the invention+the sorbitol syrup+the water are mixed. This mixture is heated until a dry matter content of 88% (about 120° C. at atmospheric pressure) is obtained. The almond paste is added, with stirring. When the temperature reaches 50° C., the initiator is added and the mixture is mixed until a homogeneous product is obtained. The glycerol is incorporated. The mixture is cooled and shaped.

The taste and the texture of the Test do not differ from that of the control.

EXAMPLE 8

Sugar-Free Nougatine

Sugar-free nougatines are produced according to the following recipes:

| | Composition used (by weight) | |
|---|---|---|
| | Control with crystallised MALTISORB ® | Test in accordance with the invention |
| Crystallised maltitol MALTISORB ® P200 | 875 | — |
| Composition in accordance with the invention I1, 80% DM | — | 897 |
| Crushed almonds | 125 | 103 |
| | 1000 | 1000 |

Procedure (Control and Test)

The crystallised maltitol is melted at 230° C. or the composition according to the invention is heated at 230° C., with slow stirring. During cooling to 220° C., the almonds are added. The mixture is poured onto a slab at 180° C. It is cooled, shaped or ground.

The taste and the texture of the Test do not differ from that of the control.

EXAMPLE 9

Aerated and Grained Boiled Sweets

Aerated and grained boiled sweets are produced according to the following recipes:

| | Composition used (by weight) | |
|---|---|---|
| | Control with crystallised MALTISORB ® | Test in accordance with the invention |
| Crystallised maltitol MALTISORB ® P200 | 744 | — |
| Composition according to the invention I1, 80% DM | — | 930 |
| Crystallised maltitol MALTISORB ® P35 | 19 | 19 |
| Water | 229 | 43 |
| Mint flavouring | 8 | 8 |
| | 1000 | 1000 |

Procedure (Control and Test)

The MALTISORB® P200/water mixture or the composition in accordance with the invention/water mixture is boiled at 195° C. at atmospheric pressure. This massecuite is introduced into a planetary mixer. The mixture is beaten (maximum speed) until the temperature reaches 140° C. MALTISORB® P30 and the mint flavouring are added. The mixture is beaten at the maximum speed. The mass is pulled for 5 min (250–300 revolutions of the arm of the pulling machine). The mixture is shaped. The products obtained are placed at 80% RH and 37° C. for 72 h.

The taste, the texture and the rate of crystallisation of the Test do not differ from that of the control.

EXAMPLE 10

Sugar-Free Lozenges

| | Composition used (by weight) | |
|---|---|---|
| | Control with crystallised MALTISORB ® | Test in accordance with the invention |
| Crystallised maltitol MALTISORB ® P200 | 1500 g | 1050.0 g |
| Composition according to the invention I1, 80% DM | — | 562.5 g |
| Gelatin solution 170 blooms at 10% DM | 150 g | — |
| Gelatin solution 170 blooms at 40% DM | — | 37.5 g |
| Mint flavouring | qs | qs |
| | 1650.0 g | 1650.0 g |

Procedure (Control and Test)

The crystallised maltitol is introduced into a kneader with a Z-shaped arm, preheated to 45° C. The gelatin solution, the composition according to the invention and the flavouring are added. The mixture is mixed for about 10 min until a homogeneous paste is obtained. The mixer is emptied. The paste obtained is laminated and stamped. The sugar-free lozenges obtained are dried for 24 h at 45° C.

The taste, the texture and the rate of crystallisation of the Test do not differ from that of the control.

The invention claimed is:

1. Liquid maltitol composition, comprising, the contents being expressed by weight relative to the dry matter content of the composition:
   a content of 94 to 98% of maltitol,
   a content of 0.2 to 3% of sorbitol,
   a content of 0.1 to 3% of maltotriitol and of at least one polyol having a degree of polymerisation equal to 3 (DP3) selected from the group consisting of panitol, isomaltotriitol, and isopanitol, said content corresponding to the equation (1):

$$(R) = \frac{\text{content of maltotriitol}}{\text{total content of } DP3 \text{ polyols}} \times 100 < 10$$

a dry matter content of between 70 and 85%.

2. Composition according to claim 1, having a dry matter content of between 70 and 80%.

3. Composition according to claim 1, wherein R< 8.

4. Process for the manufacture of a liquid maltitol composition in accordance with claim 1, wherein a fraction comprising a syrup consisting of 94 to 98% by weight, on a dry basis, of maltitol is first of all prepared, in that sorbitol and the DP3 polyols are added to this fraction in chosen proportions for each of these various constituents and such that the equation (1) is verified, and in that the dry matter content of the composition thus obtained is adjusted to the desired value.

5. Process for the manufacture of a confectionery product comprising a step of adding a filler in the form of powdered maltitol, wherein all or some of said filler is replaced with a liquid composition in accordance with claim 1.

6. Process for the manufacture of a confectionery product comprising a step of adding a filler by dissolving powdered maltitol in water, wherein said step is replaced completely or partly by a step of adding a liquid composition in accordance with claim 1.

7. Process according to claim 5, wherein the confectionery product is a chewing gum, a bubble gum, a grained boiled sweet, a lozenge, nougatine, almond paste, a fondant, a coated layer or a frosting.

8. Confectionery product obtained by the process in accordance with claim 5.

9. Process for the manufacture of a chewing gum comprising the steps consisting in:
 preparing from 5 to 95% of basic gum,
 preparing from 1 to 95% of powdered maltitol, from 0.5 to 50% of a maltitol syrup, and from 0 to 50% of a sorbitol syrup,
 preparing from 0 to 30% of glycerol,
 preparing from 0.1 to 10% of a flavouring, and from 0.001 to 1% of an intense sweetener,
 mixing the base gum, the powdered maltitol, the maltitol syrup, the flavouring, the intense sweetener and optionally the sorbitol syrup and the glycerol in order to manufacture the chewing gum,
 characterized in that all or some of the powdered maltitol is replaced by a liquid maltitol composition in accordance with claim 1.

10. Process according to claim 9, wherein the chewing gum obtained comprises from 1 to 40%, of a liquid maltitol composition in accordance with claim 1.

11. Process according to claim 9, comprising, in addition, a coating step using a liquid maltitol composition in accordance with claim 1.

12. Process according to claim 11, characterized in that the coating step is a hard coating step.

13. Process for the hard coating of a product, comprising at least one step of applying a coating syrup composed of maltitol and at least one binder, characterized in that all or some of the coating syrup or of the binder is replaced by a liquid maltitol composition in accordance with claim 1, so as to reduce the brittleness of the edible food thus coated.

14. Process according to claim 13, wherein not more than 60% of the crystallized maltitol contained in the coating syrup is substituted by a liquid maltitol composition according to claim 1.

15. Process according to claim 13, comprising, in addition, at least one step for distributing a maltitol powder having a purity greater than 90%, said application and distribution steps being carried out in any order.

16. Process according to claim 13, wherein said binder is selected from the group consisting of gum arabic, gum talha, gelatin, modified starches and celluloses, dextrins, indigestible dextrins, maltodextrins and branched maltodextrins, alone or as a mixture with each other.

17. Products intended to be ingested by humans or animals containing the liquid maltitol composition in accordance with claim 1, as a sweetening composition or as a texturing agent.

18. The process according to claim 9, wherein the chewing gum obtained comprises 1 to 25% of a liquid maltitol composition in accordance with claim 1.

19. The process according to claim 13, wherein not more than 50% of the crystallized maltitol contained in the coating syrup is substituted by a liquid maltitol composition according to claim 1.

20. The process according to claim 13, wherein not more than 40% of the crystallized maltitol contained in the syrup is substituted by a liquid maltitol composition according to claim 1.

21. The process according to claim 15, wherein the maltitol powder has a purity greater than 95%.

* * * * *